(12) United States Patent
Rechert

(10) Patent No.: US 9,975,621 B2
(45) Date of Patent: May 22, 2018

(54) STOWABLE ELEVATED FOOTSTEP FOR AN AIRCRAFT GALLEY

(71) Applicant: B/E Aerospace, Inc., Wellington, FL (US)

(72) Inventor: Hans Rechert, Milton Keynes (GB)

(73) Assignee: B/E Aerospace, Inc., Wellington, FL (US)

( * ) Notice: Subject to any disclaimer, the term of this patent is extended or adjusted under 35 U.S.C. 154(b) by 96 days.

(21) Appl. No.: 15/081,700

(22) Filed: Mar. 25, 2016

(65) Prior Publication Data

US 2016/0288898 A1 Oct. 6, 2016

Related U.S. Application Data

(60) Provisional application No. 62/141,424, filed on Apr. 1, 2015.

(51) Int. Cl.
| | | |
|---|---|---|
| *B64C 1/24* | (2006.01) |
| *B64D 11/04* | (2006.01) |
| *E06C 1/00* | (2006.01) |
| *E06C 1/387* | (2006.01) |
| *E06C 9/04* | (2006.01) |

(52) U.S. Cl.
CPC ............... *B64C 1/24* (2013.01); *B64D 11/04* (2013.01); *E06C 1/005* (2013.01); *E06C 1/387* (2013.01); *E06C 9/04* (2013.01); *Y02T 50/46* (2013.01)

(58) Field of Classification Search
CPC .. A47C 3/00; A47C 9/06; B60R 3/007; E06C 5/22; E06C 5/00; E06C 5/04; E06C 9/06; E06C 9/08; E06C 1/387; E06C 9/04; B64C 1/24; B61D 23/02
USPC .............................................. 182/189, 89, 91
See application file for complete search history.

(56) References Cited

U.S. PATENT DOCUMENTS

| | | | | | |
|---|---|---|---|---|---|
| 326,098 | A | * | 9/1885 | Bodman ................... | B60R 3/02 182/91 |
| 646,291 | A | * | 3/1900 | Krueger .................. | E06C 1/381 182/156 |
| 1,831,332 | A | * | 11/1931 | Wagner ..................... | E06C 9/14 182/156 |
| 1,852,430 | A | * | 4/1932 | Newcastle ............. | B61D 23/02 182/89 |
| 1,953,298 | A | * | 4/1934 | Goodwin ............... | B61D 23/02 105/1.3 |
| 2,052,439 | A | * | 8/1936 | Bailey ...................... | E06C 1/12 182/189 |
| 2,148,099 | A | * | 2/1939 | Bray ........................ | B66B 5/027 182/156 |
| 2,158,949 | A | * | 5/1939 | Sarles ..................... | E06C 1/387 182/91 |

(Continued)

*Primary Examiner* — Daniel P Cahn
(74) *Attorney, Agent, or Firm* — Donna P. Suchy

(57) ABSTRACT

The present invention is an improved footstep for an aircraft galley or similar monument that is retractable into the galley when not in use. The overall size of the footstep is significantly reduced by the use of a spring loaded detent mechanism. The present invention is designed to allow the footstep to remain in the deployed, horizontal position by means of a spring and plunger that cooperate to create a detent or over-center position. Further, the present invention permits the footstep to automatically return to the stowed position by virtue of the spring and plunger detent system.

10 Claims, 5 Drawing Sheets

(56) References Cited

U.S. PATENT DOCUMENTS

| | | | | |
|---|---|---|---|---|
| 3,019,851 A * | 2/1962 | Doss | | E06C 1/381 |
| | | | | 182/111 |
| 3,891,261 A * | 6/1975 | Finneman | | B60R 3/02 |
| | | | | 105/447 |
| 3,955,827 A * | 5/1976 | Wonigar | | B60R 3/02 |
| | | | | 105/445 |
| 3,986,503 A * | 10/1976 | Le Guillon | | B60R 3/02 |
| | | | | 182/89 |
| 4,087,127 A * | 5/1978 | Lotta | | A47C 9/06 |
| | | | | 108/81 |
| 4,132,288 A * | 1/1979 | Bingham | | E06C 1/381 |
| | | | | 182/100 |
| 4,193,141 A * | 3/1980 | Rosenberg | | A47K 3/28 |
| | | | | 4/447 |
| 4,432,436 A * | 2/1984 | Suiter | | B63B 27/14 |
| | | | | 114/343 |
| 4,462,486 A * | 7/1984 | Dignan | | B60R 3/02 |
| | | | | 182/91 |
| 4,542,805 A * | 9/1985 | Hamlin | | E06C 9/04 |
| | | | | 182/100 |
| 4,630,431 A * | 12/1986 | Schlueter | | A01D 41/12 |
| | | | | 182/91 |
| 4,926,965 A * | 5/1990 | Fox | | B63B 27/14 |
| | | | | 114/362 |
| 5,040,635 A * | 8/1991 | Strickland | | E06C 1/34 |
| | | | | 182/100 |
| D342,779 S * | 12/1993 | Root | | D23/304 |
| 5,927,433 A * | 7/1999 | Jaramillo, Sr. | | B63B 27/14 |
| | | | | 114/343 |
| 6,471,002 B1 * | 10/2002 | Weinerman | | B60R 3/02 |
| | | | | 182/90 |
| 6,511,086 B2 * | 1/2003 | Schlicht | | B60R 3/02 |
| | | | | 280/163 |
| 6,547,035 B1 * | 4/2003 | D'Acquisto | | A01M 31/00 |
| | | | | 182/100 |
| 6,581,876 B2 * | 6/2003 | Cheung | | B64D 11/00 |
| | | | | 244/118.5 |
| 6,755,146 B1 * | 6/2004 | Garelick | | B63B 27/146 |
| | | | | 114/362 |
| 6,782,840 B1 * | 8/2004 | Garelick | | B63B 27/14 |
| | | | | 114/362 |
| 6,840,526 B2 * | 1/2005 | Anderson | | B60R 3/02 |
| | | | | 182/127 |
| 7,740,261 B2 * | 6/2010 | Leitner | | B60R 3/02 |
| | | | | 280/163 |
| 7,976,042 B2 * | 7/2011 | Watson | | B60R 3/02 |
| | | | | 280/166 |
| 8,556,035 B1 * | 10/2013 | Kendall | | E06C 1/381 |
| | | | | 182/156 |
| 8,944,210 B2 * | 2/2015 | Sedlack, II | | B63B 27/146 |
| | | | | 114/362 |
| 9,409,055 B1 * | 8/2016 | Niemela | | A63B 27/00 |
| 9,617,788 B2 * | 4/2017 | Goodson | | E06C 1/005 |
| 2004/0207224 A1 * | 10/2004 | Miller | | B60R 3/02 |
| | | | | 296/21 |
| 2008/0100025 A1 * | 5/2008 | Leitner | | B60R 3/02 |
| | | | | 280/166 |
| 2008/0156933 A1 * | 7/2008 | Saint-Jalmes | | B64D 11/00 |
| | | | | 244/118.5 |
| 2009/0008894 A1 * | 1/2009 | Kuntze | | B60R 3/02 |
| | | | | 280/166 |
| 2009/0308688 A1 * | 12/2009 | Tayar | | B60R 3/02 |
| | | | | 182/89 |
| 2012/0125715 A1 * | 5/2012 | Furseth | | E06C 1/381 |
| | | | | 182/194 |
| 2014/0158465 A1 * | 6/2014 | Salzman | | E06C 5/22 |
| | | | | 182/127 |
| 2014/0310873 A1 * | 10/2014 | Gosling | | A47B 5/04 |
| | | | | 5/136 |
| 2015/0060204 A1 * | 3/2015 | Walter | | E06C 1/383 |
| | | | | 182/163 |
| 2015/0060205 A1 * | 3/2015 | Blackwell | | B60R 3/02 |
| | | | | 182/223 |

* cited by examiner

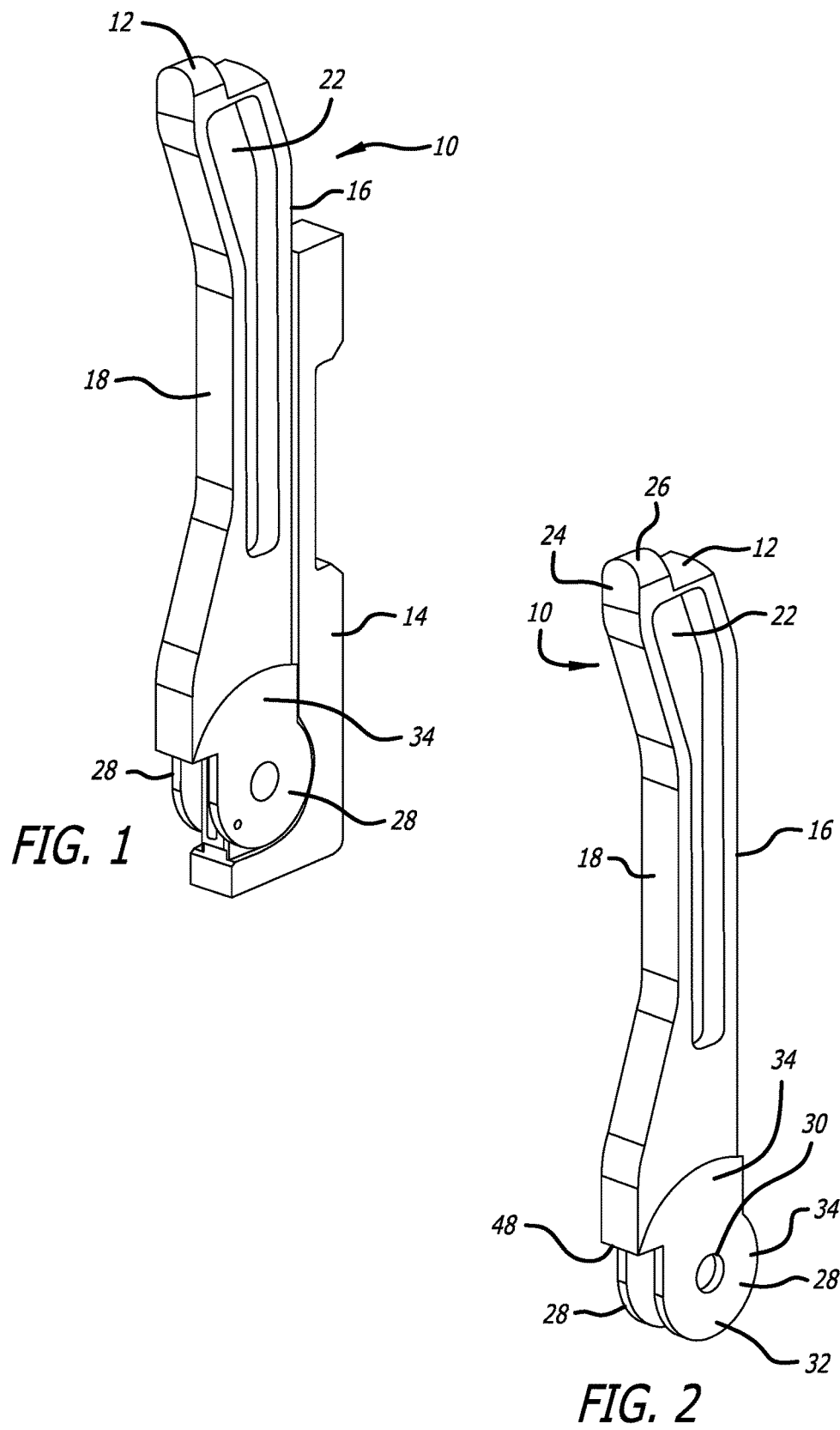

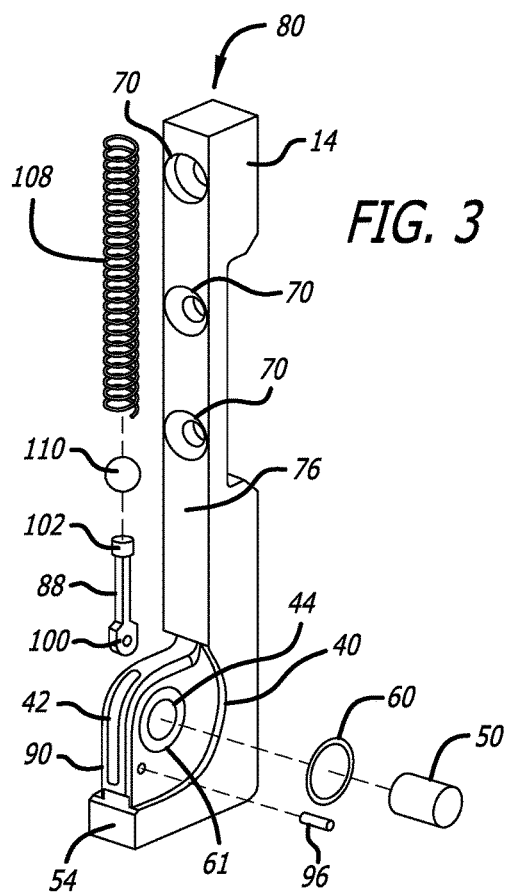
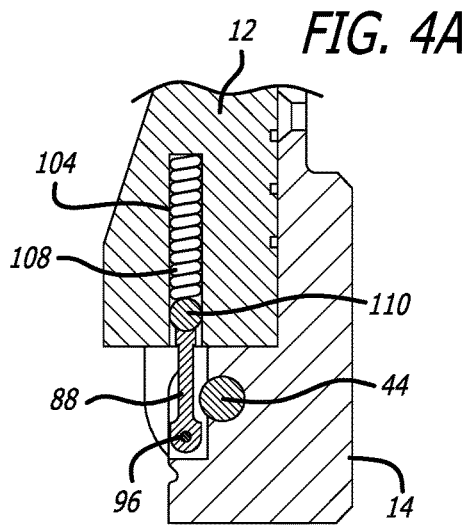
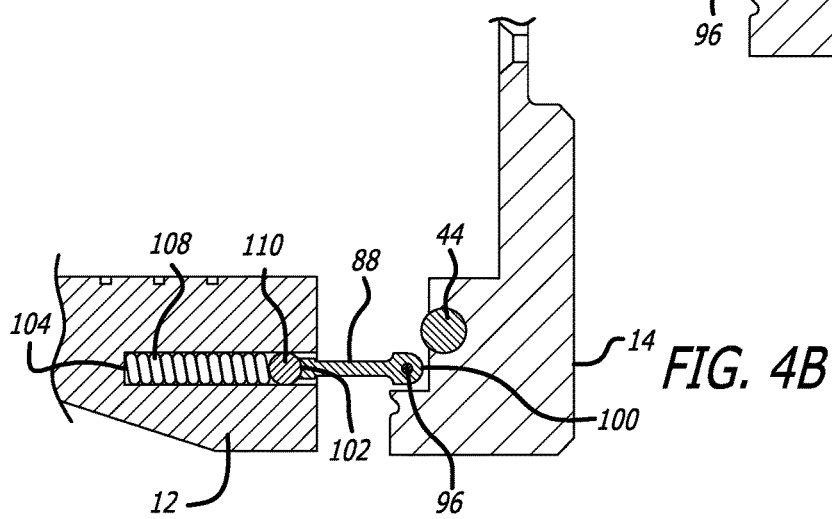
FIG. 3
FIG. 4A
FIG. 4B

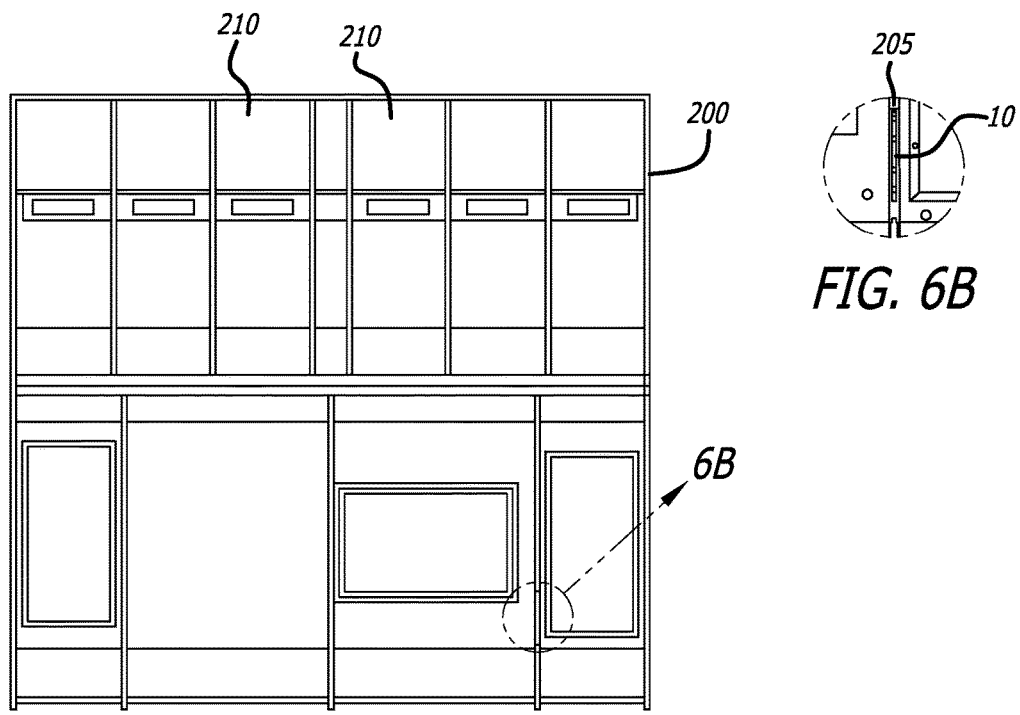
FIG. 6A
FIG. 6B
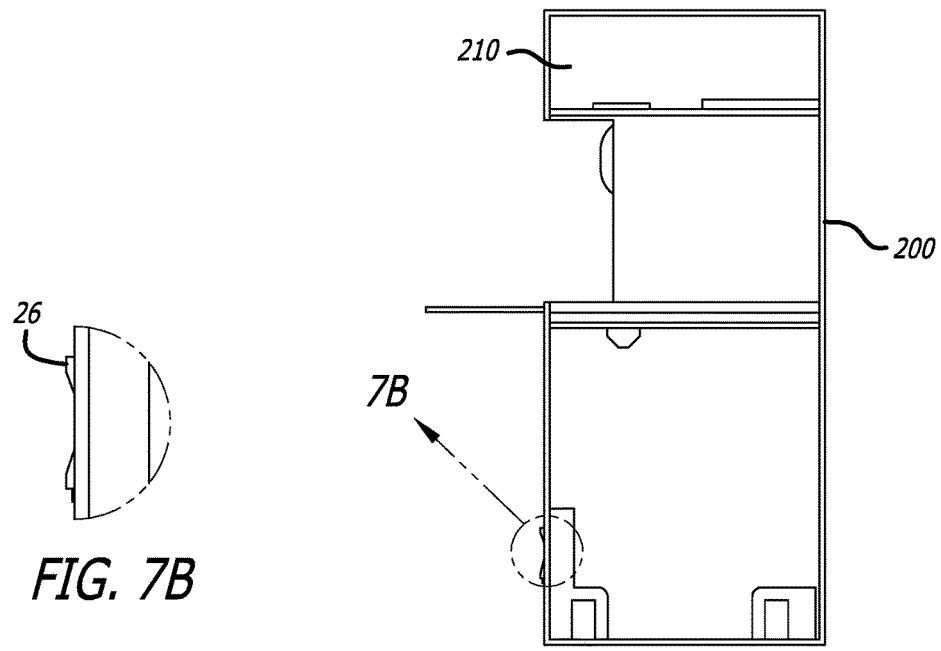
FIG. 7A
FIG. 7B

STOWABLE ELEVATED FOOTSTEP FOR AN AIRCRAFT GALLEY

CROSS-REFERENCES TO RELATED APPLICATIONS

This application claims priority from U.S. Provisional Patent Application No. 62/141,424, filed Apr. 1, 2015, the contents of which are incorporated herein by reference in its entirety.

BACKGROUND

The present invention relates to a footstep for an aircraft galley, and more particularly to a footstep with anti-vibration characteristics and improved spring design to overcome premature failure and comply with applicable regulations.

Commercial aircraft that are used for lengthy flights are typically equipped with a galley to cater to those passengers. The galley of an aircraft provides the flight attendants with an area to store, cook, and prepare food and beverages for the crew and passengers. Galleys include all of the equipment and devices to perform the passenger service, arranged in as efficient a manner as possible. Aircraft galleys must utilize available space in an economical manner since storage space is at a premium on an aircraft. To store everything that is required, galleys are often equipped with tall bays that include various compartments to house the equipment and other service items. In large aircraft the bays are overhead and deep, and the upper areas require a certain height and arm length to reach back into a deep bay to retrieve an item that is stored or has settled to the rear of the compartment. If the object cannot be reached, a footstep may be necessary to retrieve such items in elevated bays. However, footsteps can be a hazard if they are left in the galley aisle, and space must then be created for the footstep itself. Without some assistance, however, the rear portion of an upper compartment may be inaccessible, wasting vital storage space. What is needed is a safe and effective way to retrieve an object that has settled in the rear of an aircraft bay so that all available compartment space can be utilized.

To solve this problem, some galleys have been designed with a retractable step that can be released from a storage compartment, used to retrieve objects from the upper galley, and then returned to its stowed position. An example of such a footstep is U.S. Pat. No. 5,195,609 to Ham et al., issued Mar. 23, 1993. Ham teaches an automatic retractable step that is stowed in a cavity in the galley and can be extended manually from its stowed position, stood upon to retrieve an elevated object, and one or more helical springs return the step to the stowed position after use.

The problem with retractable steps such as that taught by Ham is that the repeated wear by the withdrawal and release of the step leads to premature failure of the device. Aircraft operators require 60,000 cycles of use by the step without load, but prior art steps could only achieve up to 11,000 cycles before failure. The absence of sufficient endurance resistance led to the development of the present invention, which has been tested and proven to meet or exceed the 60,000 cycle requirement even with 75 kg of load, and up to 120,000 cycles with a zero load condition.

SUMMARY OF THE INVENTION

The present invention is a recessed retractable footstep unit integrated into an aircraft galley monument having a slim, compact profile and a compression spring loaded step that easily and automatically retracts into the galley when not in use. Features of the invention include a fold up member that serves as a foot step, allowing the cabin crew of a commercial passenger aircraft to reach objects in elevated storage locations of the galley. The invention includes a machined, cast, or molded step that rotates from a stowed, vertical position to a deployed, horizontal position to establish a footstep capable of bearing the weight of an average cabin crew attendant. The invention may be deployed by the attendant using his or her foot, and incorporates a detent mechanism including a spring and plunger that retains the step in the horizontal position when deployed. The footstep of the present invention is preferably designed to automatically return the step to the retracted, vertical stowed position once raised from the horizontal detent position by the force of the compressed spring.

In a first preferred embodiment, the step is mounted on a machined, cast or molded support block that can be cold bonded with a suitable adhesive into a composite panel, affixed at a predetermined height according to aircraft manufacturer requirements. In order to meet aircraft manufacturer requirements, the device may be designed to be as light as possible but still be capable of achieving 60,000 operational cycles without signs of fatigue or failure, where aluminum or other lightweight materials having the appropriate strength characteristics are used to fabricate the step and support block.

It is understood that the footstep of the present invention would be useful for many non-aircraft-related applications, for example, in the home use, or boats, in recreational vehicles, or in any place where there is a recurring, temporary need to reach elevated areas beyond the reach of a person, and accordingly the invention should not be limited to the specific application except where expressly indicated.

Other features and advantages of the present invention will become more apparent from the following detailed description of the preferred embodiments in conjunction with the accompanying drawings, which illustrate by way of example the operation of the invention.

BRIEF DESCRIPTION OF THE DRAWINGS

FIG. 1 is an elevated, perspective view of a first embodiment of the step and support block of the present invention;

FIG. 2 is an elevated, perspective view of the step of the present invention;

FIG. 3 is an exploded view of the support block of the embodiment of FIG. 1;

FIG. 4A is a cross sectional view of a section of the step and support block illustrating the compression spring;

FIG. 4B is a cross sectional view of the section of FIG. 4A when the step is in the horizontal position;

FIG. 6A is a front view of the galley showing the retracted footstep;

FIG. 6B is an enlarged, front view of the footstep withdrawn inside the galley;

FIG. 7A is a side view, partially in phantom, of the footstep of FIG. 1;

FIG. 7B is an enlarged, side view of the exposed portion of the step of FIG. 7A outside of the galley;

DETAILED DESCRIPTION OF THE PREFERRED EMBODIMENTS

Figure 5:
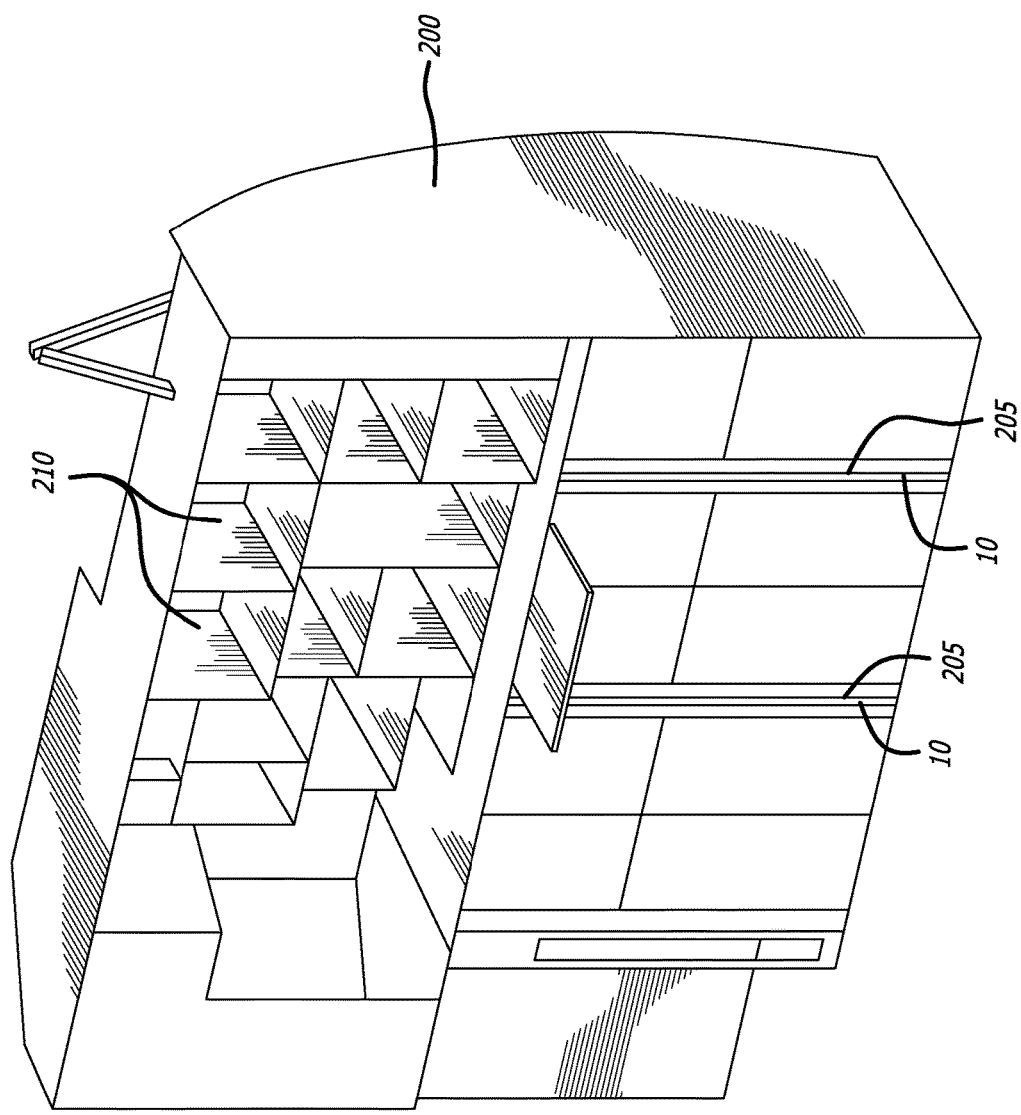
FIG. 5 is an elevated perspective view of a galley incorporating the present invention.

The present invention is an improved footstep for an aircraft galley or similar monument that is retractable into the galley when not in use. The overall size of the footstep is significantly reduced by the use of a spring loaded detent mechanism. This reduced size allows the installation of the footstep in confined and/or narrow spaces without impacting its capabilities. The design of the present invention also enhances accessibility of the device, such that it can be easily replaced within the fifteen minutes required in the industry definition of an LRU (Line Replaceable Unit). The present invention is designed to allow the footstep to remain in the deployed, horizontal position by means of a spring and plunger that cooperate to create a detent or over-center position. Further, the present invention permits the footstep to automatically return to the stowed position by virtue of the spring and plunger detent system.

FIGS. 1-3 illustrate a first preferred embodiment of a footstep unit 10 of the present invention. The footstep unit 10 comprises a pivoting step 12 and a support block or base 14. The step 12 is an elongate member having a generally flat first surface 16 that serves as the support surface when the step 12 is deployed in the horizontal position, and a substantially arched opposite surface 18. The arched surface 18 adds strength and reduces weight as compared with a solid member, and the weight reduction can further be enhances by cavities 22 on the side of the step 12. The distal end 24 includes a toe 26 that can project out of the galley and be used to deploy the footstep 10 by a user stepping down on the toe 26 to rotate the step 12 about pin 50 as described more fully below. The position of the toe 26 is preferably along the bottom edge of the arched surface 18 so as to be predominantly the only portion of the step 12 that extends outside of the galley in the stowed position. Since no portion of the unit 10 extends outside the plane of the monument 200 except the toe 26, the opportunity for tripping or catching the footstep unit 10 while walking in the galley is minimized.

The proximal end of the step 12 includes a pair of rounded, spaced apart retainer plates 28 that cooperate to form a yoke member 34. Each retainer plate 28 has a central bore 30 collinear with the bore of the opposite plate, such that a pin 50 can be inserted through the retainer plates 28 to secure the yoke 34 to the support block 14. Each retainer plate 28 has a circular proximal end 32 that conforms with a corresponding and mating shoulder 40 on the support block 14, such that the retainer plates 28 bear against the conforming shoulder 40 when the step 12 is mounted at the pin 50 on the support block 14. The support block 14 includes a lug plate 42 at the shoulder 40, the width of the lug plate 42 selected to be received between the retainer plates 28 of the yoke 34 in a snug relationship to eliminate any "play" in the coupling. The lug plate 42 includes a hole 44 that coincides with the central bores 30 of the retainer plates 28, and the pin 50 passes through the central bores 30 of the retainer plates 28 and the hole 44 of the shoulder 40 to lock the yoke 34 to the lug plate 42, and thus the step 12 to the support block 14.

Because the circular arcs of the retainer plates 28 conform with and bear against the contour of the shoulder 40, the step 12 can pivot about the pin 50 while still supported by the lug plate 42 and the shoulder 40 of the support block 14. The range of rotation of the step 12 on the pin 50 in a downward direction is limited by interference of a ledge 48 on the yoke 34 with a base portion 54 supporting the lug plate 42. With the step 12 fully extended in the horizontal position, the ledge 48 of the step 12 engages and bears against the base portion 54 of the support block 14, resisting further downward rotation and supporting while stabilizing the step 12 in the horizontal position.

The lug plate 42 is preferably formed with annular recesses 61 on each side about the hole 44, each having a depth selected to receive a stabilizer 60 therein. The stabilizers 60 on each side of the lug plate 42 serve to reduce or eliminate vibration, misalignment, wobble, and other deleterious effects, and provides a secure, friction-reducing contact between the retainer plates 28 and the lug plate 42. The stabilizers are preferably coated with a friction-reducing coating or are made of a material that reduces the friction between the yoke 34 and the lug plate 42, such that binding or other unwanted offset loading are reduced.

The support block 14 can preferably be machined to include three or more apertures 70 that can be used to mount the support block 14 to the galley. The base 54 is wide enough to provide adequate width for the shoulders 40 to support the rounded ends 32 of the retainer plates 28. On one or both of the opposed faces 16, 76 of the step 12 and support block 14, respectively, a preferred embodiment is to incorporate one or more magnets 80 that magnetically engage the opposed surface to maintain the step 12 in the upright, stowed position when not in use. To deploy the step 12, a downward force is applied to the toe 26 to overcome the attractive forces of the magnet(s) 80 and allow the step to rotate about the pin 50 from its upright stowed position to its deployed horizontal position.

The footstep 10 of the present invention preferably includes an automatic return mechanism that returns the step 12 to its upright position stowed in the galley when not in use. The return mechanism is illustrated in FIGS. 3 and 4, where a lever 88 is disposed inside an open slot 90 at the front facing surface of the lug plate 42. The lever 88 is fixed to the lug plate 42 within the slot 90 at a first end 100 by pin 96 so that the lever can pivot in a vertical plane through the slot 90. The slot 90 establishes a gap that allows the lever 88 to pivot approximately ninety degrees as the step 12 rotates from the vertical position to the horizontal position. The unpinned end 102 of the lever 88 preferably has a cup-shaped end that extends slightly into a bore 104 in the ledge 48 of the step 12. Within the bore 104 is a coil spring 108. A ball 110 is disposed between the end 102 of the lever 88 and the end of the compressed spring 108 (FIG. 4A) to ensure proper engagement of the spring 108 with the end 102 of the lever 88. The location where the lever 88 is pinned, i.e. ahead of the hole 44, causes the compression spring 108 to be minimally compressed by the lever/ball combination when the step 12 is in the upright position because the intrusion of the lever 88 into the bore 104 is at its minimum when the step 12 is vertical. Conversely, as the step 12 rotates downward from the stowed vertical position to the deployed horizontal position, the end 102 of the lever 88 extends deeper into the bore 104 of the step 12, thereby increasing the compression of the spring 108. The force applied by the spring 108 tends to want to restore the step 12 back to the vertical position in increasing amounts as the step rotates toward the horizontal alignment. The spring 108 is preferably selected so that the deployment of the step 12 against the force of the compression spring 108 will be overcome by the weight of the step 12, although in an alternate embodiment the spring 108 can be selected to overcome even the weight of the step 12. In this latter case, the downward force on the step 12 must be maintained throughout its use, or the force applied by the coil spring 108 will automatically return the step 12 vertically to its stowed configuration.

The automatic return mechanism can also operate as a detent to temporarily maintain the step 12 in the horizontal position. That is, the force of the spring 108 against the lever 88 is below the force of the pin 50 on the yoke 34. These forces are in the opposite direction and cancel in the horizontal direction when the step 12 is fully deployed (FIG. 4B). However, the slight vertical offset of the latter force with respect to the former force creates a small torque on the step 12 in the downward direction, thereby maintaining the step 12 in the horizontal position. The small downward torque may easily be overcome by a slight upward push of the step with a foot, whereby the force of the compression spring 108 predominates and the step 12 is rotated back to the vertical or upright position.

Figure 8A:
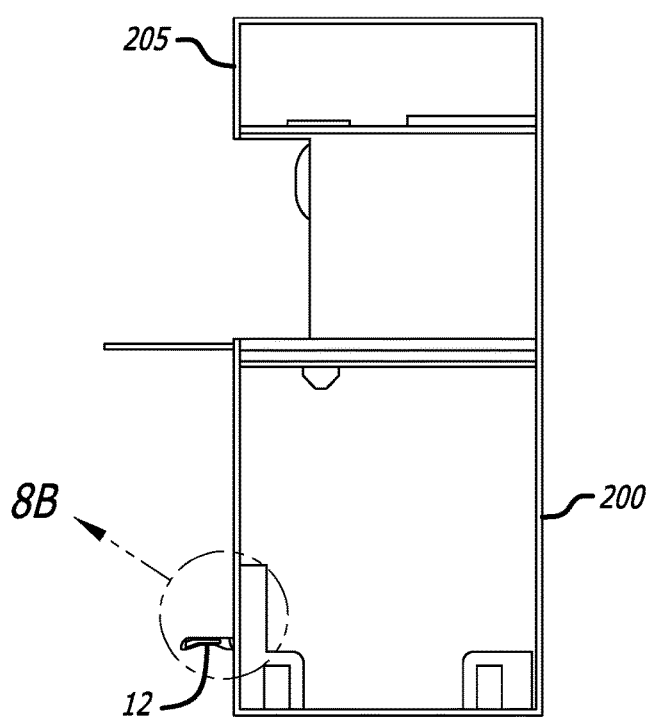
FIG. 8A is a side view, partially in phantom, of the footstep of FIG. 7A in the deployed, horizontal position.
Figure 8B:
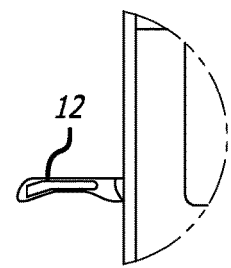
FIG. 8B is an enlarged, side view of the step of FIG. 7A in the deployed, horizontal position.

FIG. 5 illustrates a galley 200 having a cavity 205 when the footstep 10 of the present invention may be positioned. Here, the galley's upper cabinets 210 can be accessed using the footstep 10 in a safe and reliable manner. FIGS. 6A and 6B show a front view of the galley 200, and FIGS. 7A and 7B show a side view of the footstep 10 in the stowed position. FIGS. 8A and 8B illustrate the footstep 10 in the deployed position.

It will be apparent from the foregoing that while particular forms of the invention have been illustrated and described, various modifications can be made without departing from the spirit and scope of the present invention. Accordingly, it is not intended that the invention be limited but rather all modifications and substitutions that would be recognized by one of ordinary skill in the art are intended to be included in the scope of the invention.

The foregoing descriptions and the accompanying drawings are intended to be illustrative and exemplary of the present invention, but not limiting. Rather, those skilled in the art will readily appreciate that they may be many modifications and substitutions to the above described embodiments without departing from the spirit of the present invention. These modifications and substitutions are included in the scope of the present invention, the breadth of which is defined by the words of the appended claims using their plain and ordinary meanings in light of, but not confined by, the descriptions herein.

I claim:

1. A pivoting step assembly adapted to be mounted within a recess of a wall structure having a substantially vertical, planar presentation, the pivoting step assembly comprising:
    a step having spaced apart retainer plates at a first end, the retainer plates each having a circular profile along a first surface and a central bore therethrough;
    a base having a lug plate that is disposed between the retainer plates of the step, and first and second circular shoulders for receiving the spaced apart retainer plates, and an aperture in the lug plate aligned with the central bores in the retainer plates;
    a pin passing through the retainer plates and the lug plate at the central bores and aperture, respectively, such that the step is configured to pivot about the pin between a stowed vertical position adapted to be within the wall structure and a deployed horizontal position adapted to extend from the wall structure;
    a restoring system for urging the step to move from the deployed horizontal position to the stowed vertical position, the restoring system comprising a spring member disposed in a bore of the step, a lever pinned to the base and partially extending into the bore of the step, and a ball disposed between an unpinned end of the lever and one end of the spring member, where the spring is adapted to be compressed by the ball as the step rotates from the stowed vertical position to the deployed horizontal position.

2. The pivoting step assembly of claim 1, wherein the step includes a toe at a second end adapted to extend from the wall structure when the step is in the stowed vertical position.

3. The pivoting step assembly of claim 1, further comprising at least one magnet incorporated into the base adapted to maintain the step in the stowed vertical position when not in use.

4. The pivoting step assembly of claim 1, wherein the lever resides at least partially in an open slot along a front surface of the lug plate.

5. The pivoting step assembly of claim 1, where the wall structure is an aircraft galley.

6. The pivoting step assembly of claim 1, where the restoring system is neutralized when the step is in the deployed horizontal position.

7. The pivoting step assembly of claim 1, wherein the step has an arched first surface and a substantially planar second surface, the second surface bearing against the base when the step is in the stowed vertical position.

8. The pivoting step assembly of claim 1, wherein the base includes a stop that bears against a ledge of the step when the step is in the deployed horizontal position to prevent further rotation of the step relative to the base.

9. The pivoting step assembly of claim 1, wherein the step has first and second cavities that extend substantially a length of the step on respective first and second sides.

10. The pivoting step assembly of claim 1, further comprising first and second stabilizing members disposed in annular recesses of the lug plate about the aperture, the first and second stabilizing members seated between the retainer plates and the lug plate.

* * * * *